(12) United States Patent
Marinelli

(10) Patent No.: US 8,922,865 B2
(45) Date of Patent: Dec. 30, 2014

(54) METHOD FOR PRODUCING PHOTOCHROMATIC OPTICAL ELEMENTS, AND PHOTOCHROMATIC OPTICAL ELEMENTS

(76) Inventor: Giancarlo Marinelli, Isernia (IT)

( * ) Notice: Subject to any disclaimer, the term of this patent is extended or adjusted under 35 U.S.C. 154(b) by 249 days.

(21) Appl. No.: 13/264,575

(22) PCT Filed: Apr. 15, 2010

(86) PCT No.: PCT/IT2010/000163
§ 371 (c)(1),
(2), (4) Date: Jan. 3, 2012

(87) PCT Pub. No.: WO2010/119477
PCT Pub. Date: Oct. 21, 2010

(65) Prior Publication Data
US 2012/0176657 A1    Jul. 12, 2012

(30) Foreign Application Priority Data
Apr. 16, 2009 (IT) .................. IS2009A0001

(51) Int. Cl.
G02F 1/03 (2006.01)
B29D 11/00 (2006.01)
(52) U.S. Cl.
CPC .................. *B29D 11/00865* (2013.01)
USPC ........................................ 359/241
(58) Field of Classification Search
USPC ........................................ 359/241
See application file for complete search history.

(56) References Cited

U.S. PATENT DOCUMENTS

| 4,268,134 A | 5/1981 | Gulati et al. |
| 2011/0262636 A1* | 10/2011 | Ohta et al. .................. 427/162 |

FOREIGN PATENT DOCUMENTS

| EP | 1890184 | 2/2008 |
| EP | 1967283 | 9/2008 |
| EP | 2199844 | 6/2010 |
| FR | 2236196 | 1/1975 |
| IT | 1016198 | 5/1977 |
| WO | WO2007/070975 | 6/2007 |
| WO | WO2009/025272 | 2/2009 |

OTHER PUBLICATIONS

International Search Report of the International Searching Authority mailed Aug. 24, 2010, issued in connection with International Patent Appl. No. PCT/IT10/000163 (4 pages).
Written Opinion of the International Searching Authority mailed Oct. 16, 2011, issued in connection with International Patent Appl. No. PCT/IT10/000163 (5 pages).
English Translation of Italian Patent IT1016198 corresponds to Patent No. FR2236196 A1 in the same family, published on Jan. 31, 1975, owned by Polaroid Corp. (12 pages).
English Translation of International Publication No. WO2009/025272 published on Feb. 26, 2009, as published under Application No. EP 2 199 844 A1, owned by Hoya Corporation (36 pages).

* cited by examiner

Primary Examiner — James Jones
(74) Attorney, Agent, or Firm — McCarter & English, LLP

(57) ABSTRACT

The present invention refers to a process for the preparation of photochromatic optical elements, and corresponding photochromatic optical elements. Starting from a given optical body, the process according to the invention comprises the following steps: depositing a first layer comprising a transparent resin at least onto a part of said optical body; depositing onto the first layer previously deposited a second layer comprising photochromatic pigments.

12 Claims, 1 Drawing Sheet

*Mains stages of the dip-coating process :* [1] *Dipping of the optical element into the coating solution;* [2] *Wet layer formation;* [3] *Gelation of the layer by solvent evaporation*

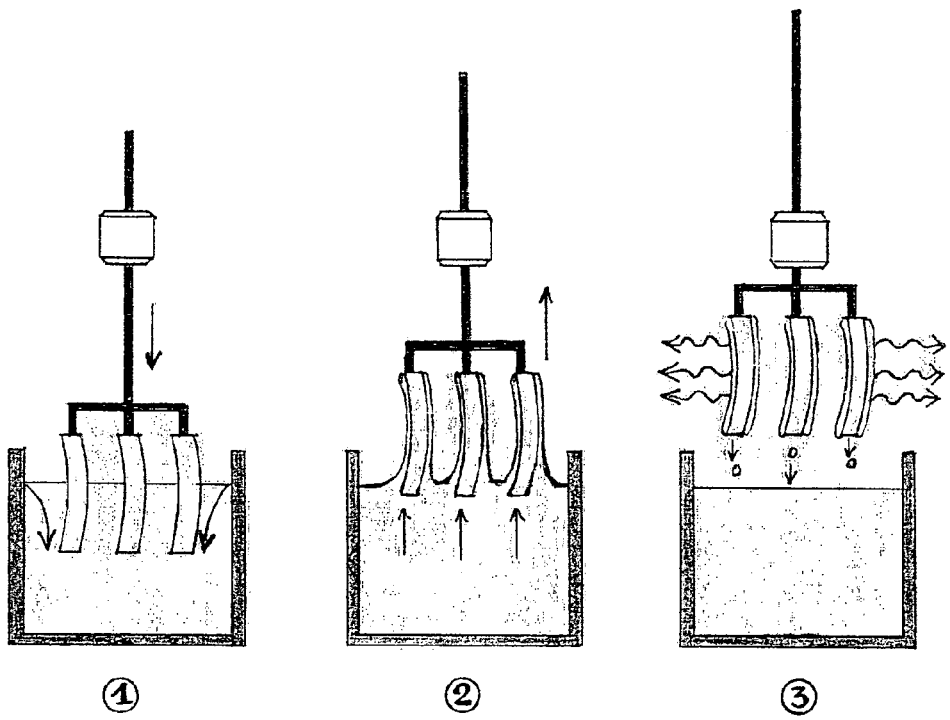
Fig. 1 – Mains stages of the dip-coating process : [1] Dipping of the optical element into the coating solution; [2] Wet layer formation; [3] Gelation of the layer by solvent evaporation
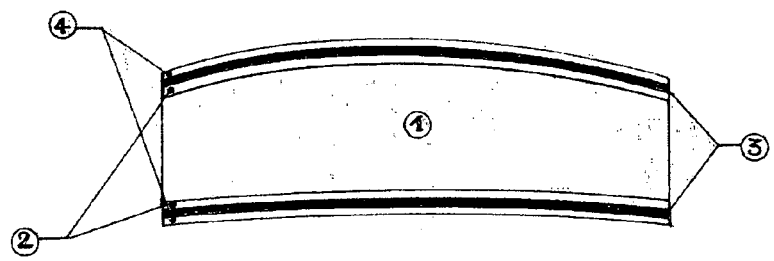
Fig. 2 - Sectional view of lens or optical element multilayer coated by dip-coating method:
 [1] Lens or optical element substrate; [2] Bases layers; [3] Photochromics layers; [4] Protection layers

METHOD FOR PRODUCING PHOTOCHROMATIC OPTICAL ELEMENTS, AND PHOTOCHROMATIC OPTICAL ELEMENTS

RELATED APPLICATIONS

This application is a U.S. National Phase Application under 35 U.S.C. 371 of International Application No. PCT/IT2010/000163 filed Apr. 15, 2010, which was published on Oct. 21, 2010 under International Publication Number WO 2010/119477 A1, which claims the benefit of Italian Patent Application No. IS2009A000001 filed on Apr. 16, 2009, the entire disclosures of which are all incorporated herein by reference in their entirety.

FIELD OF THE INVENTION

The invention concerns an innovative process for the production of photochromatic optical bodies, optical bodies and optical bodies produced by this method. Furthermore, the present invention is directed at products in which said photochromatic optical elements are applied. Examples of such products are photochromatic organic ophthalmic lenses, photochromatic solar filters, visors for helmets and photochromatic masks. In general, it concerns any type of application which provides an optical element sensitive to luminous radiation which is activated, darkening, when it is exposed to a particular light source.

STATE OF THE ART

In the state of the art, photochromatic (photochromic) lenses are known which are distinguished by their capacity to darken in the presence of sunlight and to reversibly reacquire their transmittance (in other words, to fade or clear) when no longer exposed to sunlight. These lenses therefore have the advantage of adapting to ambient luminosity conditions, avoiding for example excessive dazzling in the presence of intense sunlight on the person using such lenses. The effect is provided by the presence of photochromatic pigments comprised in the optical body or lens. The energetic activation provided by electromagnetic radiation (light) reversibly modifies the steric conformation of the photochromatic pigments, or of the organic molecules of the pigment, which then change colour more or less intensely: the lens darkens, assuming a particular colour, depending on the pigment or mixture of pigments used.

Known processes for producing this type of optical body, lenses and other assimilable manufactured products, currently on the market, fall into one of the following types.

According to a first type of process, the organic pigments capable of colouring more or less intensely and reversibly if exposed to sunlight, are dispersed within the entire mass of the optical bodies, for example inside material constituting organic ophthalmic lenses before polymerization. The process with the photochromatic pigments dispersed inside the mass of the lens was, until a few years ago, the only one known and used.

According to a second type, the organic pigments are arranged directly on the outer surface only of the already finished organic ophthalmic lenses, creating a film which is activated if exposed to sunlight and fades reversibly in the absence of sunlight. A method according to the second type provides for the application of a layer of lacquer containing photochromatic pigments onto an object which will come to constitute the lens. When the object is heated there is a thermal transfer of the photochromatic pigments into the matrix of the object itself. The layer of lacquer is then removed. This method has various disadvantages: for example its application is restricted to lenses having low or medium refractive indices, it is applicable only to a limited number of colourations provided by the photochromatic pigments, and it has long reaction times, i.e. darkening or clearing times. A further method according to the second type provides for the use of moulds, wherein the photochromatic layer is arranged in the inside of the mould, for example by spraying the photochromatic pigments into the inside of the mould. According to a technique known in the art, the lens is polymerized inside a casting machine, adjacently to a thin layer consisting of a resin containing photochromatic molecules which are dispersed in it. This thin photochromatic layer is applied to the inner face of the convex glass mould before inserting into the mould the material which will come to constitute the lens. Once the partly or completely polymerized photochromatic layer has been applied, the prepolymer is then cast in the fluid state, with the catalyst dissolved in it. The photochromatic layer then undergoes the entire curing treatment (generally thermal) necessary for the polymerization of the body of the lens. In other words, the lens is constructed on the photochromatic layer and both are cured together.

Another technique known in the art for depositing a photochromatic layer directly onto the lens consists of spin-coating. The technique of spin-coating, as is known, consists of depositing the fluid sol at the centre of the lens, which is placed on a disc rotating at a controlled angular velocity; the angular velocity of rotation causes a film to be deposited from the centre to the periphery of the lens, of as uniform a thickness as possible.

According to the types indicated above, therefore, the photochromatic properties are provided by dispersing organic pigments inside the mass of the prepolymer before the final reticulation of the resin occurs inside the mould, or by covering the outer surface of an organic ophthalmic lens with a thin layer of photochromatic pigments of various colours, making use of processes of various types.

Both these processes, however, have various disadvantages and defects, as explained below.

In the case of the dispersion of photochromatic pigments into the entire mass of the lens according to the first type of process, the intensity of the photochromatic colouration of the ophthalmic lens, for a given concentration of organic pigments dispersed in its mass, depends on the thickness of the latter. Greater thicknesses correspond to greater intensities of colouration. Therefore, since in ophthalmic lenses the thickness is variable from one point on the surface to another, variable shades of colour will be visible, moving from the centre to the periphery of the lenses. Positive ophthalmic lenses can thus appear lighter at the periphery and darker at the centre, while the opposite will be observable in the case of negative ophthalmic lenses. For a wearer of photochromatic ophthalmic lenses who needs lenses with different gradations or, in some cases, very different for the two eyes and therefore with two lenses of different thicknesses, there will be different intensities of colouration, which are larger and more perceptible the greater the difference of corrective gradation between the two eyes. For expediency and convenience of the production processes, photochromatic ophthalmic lenses made by the dispersion of organic pigments into the mass of the lenses have a single refractive index and cannot have different indices, with all the disadvantages due to thicknesses which this simplification implies. The disadvantages described above also occur with other types of optical body having variable thickness. Further disadvantages also exist in the presence of a non-uniform concentration of pigments inside the material forming the lens or optical body, resulting in non-uniform photochromatic behaviour. Furthermore, lenses or optical bodies produced by dispersion of organic pigments into the mass frequently present defects of various kinds. Lenses found to be defective at quality control, even, with minor defects, are not susceptible to salvaging by any means and are destined for scrapping. For example, it is impossible to salvage lenses where the distribution of photochromatic pigments is not uniform.

Even photochromatic ophthalmic lenses obtained by direct deposition on the outer surface according to the second type of process described above, are not exempt from defects or disadvantages of other kinds.

For example, the technique according to the second type consisting in the use of moulds reveals itself in practice to be complex, costly, with results that are hard to reproduce and poor repeatability, and with a high percentage of production rejects. The process for curing the material which is to constitute the lens, furthermore, is indirectly applied to the photochromatic layer previously arranged. The photochromatic properties are therefore compromised.

The process which uses the technique of spin-coating for depositing the active photochromatic layer onto the outer surface of the ophthalmic lens can generate surface irregularities; these irregularities are not positive in any instance but are certainly to be avoided in the case of corrective ophthalmic lenses.

In any case, lenses produced according to the techniques known in the art have a low speed of adaptation to changes of sunlight. In fact they require long times for darkening and even longer times for clearing when the intensity of sunlight diminishes. This entails significant disadvantages in the use of these lenses.

SUMMARY OF THE INVENTION

The present invention has as its object to provide a process for the production of photochromatic optical elements, and photochromatic optical elements produced by this process, such that it presents improvements compared with the lenses known in the art. Among other advantages, the process according to the invention is easy to execute, has a high efficiency, a low scrappage rate (high yield), and results in photochromatic optical bodies with low response times to changes in sunlight compared with those of the currently known lenses. In particular, lenses according to the present invention have lower darkening times than those of the known lenses. Furthermore, the clearing times are even more rapid than in the lenses known in the art.

The object of the invention is achieved through the solutions described in the claims. The present description comprises embodiments and examples suitable for clarifying the principle of the invention as defined by the claims. According to a first aspect of the invention, a process is provided for the preparation of photochromatic optical elements starting from a given optical body. Said optical body is a component endowed with a determinate transparency and having determinate optical properties such as a certain refractive index. The optical body is preferably already finished and produced according to a technique known to a person skilled in the art. The photochromatic optical element is the structure having photochromatic properties comprising the said optical body. The process according to this aspect of the invention provides a step comprising the deposition of a first layer comprising a transparent resin onto said optical body. This first layer does not have photochromatic properties and has the function of isolating the optical body from layers deposited later. This process therefore provides a further step comprising the deposition onto the first layer previously deposited of a second layer comprising photochromatic pigments (or particles, even though reference will be made below to pigments). In other words, the first layer is interposed between the optical body and the second layer comprising photochromatic pigments. The first layer is therefore a separator layer with grip characteristics such as to remain attached to the optical body and such as to keep the second photochromatic layer attached. This first layer is selected so as not to be solubilizable with the photochromatic layer. A person skilled in the art will therefore be able to select the first layer according to the second photochromatic layer. In other words, once the composition of the second photochromatic layer has been selected, a person skilled in the field will select the composition of the first layer so that it is not solubilizable with the second, and so that it has the aforementioned grip characteristics. In the event that the composition of the first layer is selected first, on the other hand, the second layer will be selected so that it is not solubilizable with the first. The sequence is such that the first layer is deposited onto a finished optical body and the second layer is deposited subsequently onto the first layer. In one example, this deposition is executed so that the first layer is such as to isolate the second layer comprising photochromatic pigments from the material of the optical body. The second layer is therefore the one comprising photochromatic pigments and is therefore responsible for the photochromatic properties of the photochromatic optical element. The function of the first layer is to isolate the optical body from the second layer and therefore to allow strong adhesion of the subsequent photochromatic layer to the base optical body.

The presence of the first layer deposited onto the optical body and interposed between the second layer and the optical body allows the photochromatic pigments comprised in the second layer to assume the steric positions necessary for the purpose of exploiting their photochromatic properties with maximum efficiency. This results in a capacity for adapting to changes in the sunlight considerably superior to that of already known lenses. The resulting photochromatic element darkens more rapidly than already known lenses and clears even more rapidly than already known lenses, as is easily verified by comparative tests.

The process furthermore is easily reproducible and efficient, and leads to extremely low waste factors if compared with already known methods.

A second aspect of the present invention provides a photochromatic optical element obtained by one of the processes or steps of the processes described above.

A third aspect of the present invention provides a photochromatic optical element comprising a given optical body, a first layer comprising a transparent resin arranged on the optical body and a second layer comprising photochromatic pigments. The second layer is arranged on the first layer and the first layer in one example is such as to isolate the second layer comprising photochromatic pigments from the material of the optical body.

Further advantages and embodiments of the invention are provided by the dependent claims and by further examples and embodiments as described below.

BRIEF DESCRIPTION OF THE DRAWINGS

FIG. 1 shows some steps of the dip-coating method according to an example of the present invention;

FIG. 2 shows a photochromatic optical body according to an example of the present invention.

DETAILED DESCRIPTION

A first embodiment of the invention specifies a process for the preparation of photochromatic optical elements starting from a given optical body. The given optical body is a component endowed with a determinate transparency and having determinate optical properties such as a certain refractive index. In other words, the optical body allows the light to pass through in such a way that a user is able to look through this optical body. The optical body to which the process is applied is a finished optical body produced according to a technique known to a person skilled in the art. for example the optical body can be produced by means of a mould inside which the material which will constitute the optical element is treated (in other words, the curing of the material constituting the optical body can be performed inside the mould). Other techniques can be adopted provided that they result in a finished optical body having certain properties of transparency and refractive index. According to some examples the optical body can be represented by a concave or convex lens, by a flat concave or convex transparent layer, by a visor, by a transparent sheet, by an ophthalmic lens, etc . . . The invention is applicable to any product which comprises an optical body having a certain refractive index. The material usable for producing the optical body can consist of monomers.

The aforementioned photochromatic optical element, representing another embodiment of the invention, is created by means of the process of the invention and represented by the given optical body endowed with photochromatic properties, i.e. the capacity to reversibly change transmittance and/or colouration in the presence of variations of the intensity of sunlight. The reversibility is linked to the fact that transmittance and/or colouration return to the state antecedent to that caused by exposure to sunlight.

The process according to the first embodiment specifies a step comprising the deposition of a first layer comprising a transparent resin onto said optical body. This first layer does not have photochromatic properties and has the function of isolating the optical body from layers deposited later.

The first layer is therefore a separator layer with grip characteristics such as to remain attached to the optical body or to the matrix of the optical body and such as to keep the second photochromatic layer attached. This first layer is selected so as not to be solubilizable with the photochromatic layer. Various types of resin can be used provided that they maintain a certain level of transmittance so as to not impair the optical properties of the underlying optical body. A person skilled in the art is able to select an appropriate resin as indicated above and according to the grade of transmittance desired and according to the material of the optical body which said resin must be suitable for binding.

The process according to this embodiment therefore specifies a further step comprising the deposition onto the first layer previously deposited of a second layer comprising photochromatic pigments. In other words, the first layer is interposed between the optical body and the second layer comprising photochromatic pigments. The sequence is such that the first layer is deposited onto a finished optical body and the second layer is deposited subsequently onto the first layer. In one example, this deposition is executed so that the first layer is such as to isolate the second layer comprising photochromatic pigments from the material of the optical body. The second layer is therefore the one comprising photochromatic pigments and is therefore responsible for the photochromatic properties of the photochromatic optical element. The function of the first layer is to isolate the optical body from the second layer. The person skilled in the art therefore, according to the circumstances, meters the first layer sufficiently to ensure that the second layer does not come into contact with the optical body or with the surface of the optical body. The first layer, as we have already said, enables the photochromatic layer to be isolated from the optical body. The photochromatic pigments can therefore freely assume an optimal configuration for exploiting their proper photochromatic function without being affected by the structure of the surface of the optical body. In fact, the photochromatic pigments can assume the steric positions necessary for exploiting their photochromatic properties with maximum efficiency. Without the first layer, in fact, the photochromatic pigments would be sterically limited by the matrix of the optical body and would not react to changes in the intensity of sunlight with the same rapidity and reversibility as in the present invention. This is why it is so rapid in darkening and clearing with variations in the light to which the optical body is exposed. Furthermore, since the photochromatic layer is arranged on the already finished optical body, the photochromatic pigments do not have to undergo the treatments necessary for forming the optical body. Therefore, the photochromatic properties are not damaged by the processes necessary for producing the optical body.

According to a first non-restrictive example of the process of the first embodiment, the deposition of the first layer can comprise depositing a first solution having a first base comprising the transparent resin; in addition, the deposition of the second layer can comprise depositing a second solution having a second base comprising the photochromatic pigments, wherein the second base is different from the first base. According to this example, a so-called "wet-coating" method can be used consisting in the application of the first and the second layer with the deposition of a liquid solution. The "wet-coating" can be achieved using various techniques such as dip-coating, spin-coating or spray-coating through which the liquid solution is deposited onto the substrate represented by the optical body. In the liquid solution there are comprised, according to the layer which it is desired to deposit, determinate compounds and substances. The invention according to the present example can be executed by means of any of the techniques of "wet-coating", as long as the solutions used are characterized by two different bases.

In the present invention, by 'solution having a determinate base' is meant a solution comprising a determinate substance or compound, wherein the determinate substance or compound is present in predominant measure compared with other substances or other compounds which may be present in the same solution. By 'predominant measure' is meant that said predetermined substance or compound is present in greater measure (for example in %) than other substances or compounds present in the solution. For example, as will be described below, a water-based solution implies that the solution comprises a high percentage of water compared with other substances or compounds present in the same solution. The percentage can be represented by a percentage by weight. Therefore, according to this example, the solutions deposited successively to come to form the two layers are distinguished by containing two different predominant substances or compounds. The steps of deposition are effected in succession, however it is advisable to allow a lapse of time to pass between the first step of deposition of the first layer and the second step of deposition of the second layer in order to allow the gelation of the layers by evaporation of the solvent. The latter step can be accelerated and completed through suitable means of heating such as a heated chamber for example. The advantage of the solution according to this first example of the first embodiment consists in the fact that during the step of deposition of the second layer, the composition of the first layer is not disturbed or damaged. In fact, since the first layer was deposited using a solution having a base different from that of the second solution, the first layer will not pass into the solution of the second layer (when this is deposited still wet, i.e. in a state not yet dried), being not soluble in this (or at least soluble in minimal or indeed negligible quantity). Therefore, the second photochromatic layer will be successfully deposited without impairing the first layer (or disturbing it only to a minimal extent), which will allow the photochromatic molecules to be uniformly separated from the optical body and to fulfil as well as possible their photochromatic functions with high reaction speeds and high speeds of reversibility (as is also explained in other parts of the present description).

According to a further example of the process of the first embodiment, the first solution having a first base comprises a solution with a water base. As mentioned above, this implies that the water-based solution comprises water in a predominant proportion compared with the other substances present. i.e. that water is the substance present in a higher percentage than the other substances present in solution. This does not exclude the possibility of other substances or compounds being present, such as for example other organic solvents. In this case, however, the content of these organic solvents is lower than the content of water.

According to a further example of the process of the first embodiment, the second solution having a second base comprises a solution with a base of organic solvents. Therefore, this second solution has a composition in which organic solvents are present in a higher percentage than other substances or compounds present in solution. It should be noted that this does not exclude the possibility that water, too, is present in this second solution. In this case, however, the percentage will be lower (preferably it will be decidedly lower) than the percentage of water present in the first solution and lower (preferably, decidedly lower) than the global percentage of organic solvents in the second solution (in fact, several organic solvents may be present; in this case the percentage of water is lower or perceptibly lower than the percentage of the totality of the organic solvents.

The process according to this embodiment can comprise as a further, optional, step the deposition onto the second layer of a third layer comprising a solution of a resin, wherein this third layer is such as to isolate the second layer from the outside. The first and the third layers, therefore, come to enclose the second layer which has photochromatic properties. In other words, the second layer results in being interposed between the first and the third so as to create a sandwich structure. The substances of the second and third layer must therefore be selected so that the second layer is not solubilizable in the solution that comes to form the third layer. For example, when the second layer has already been determined, the solution of the third layer must be selected so that the second layer is not solubilizable in the solution that comes to form the third layer. The second layer must furthermore be such as to permit an anchorage of the third layer onto it. A person skilled in the art will therefore be able to select the various layers from the first to the third provided that they check that the first layer is not solubilizable in the solution which will come to form the second layer and provided that the second layer is not solubilizable in the solution which will come to form the third layer. The advantage of this process consists in the fact that it is possible to obtain an isolation of the photochromatic substances from the external environment and from contact with the surface of the optical body. The third layer protects the photochromatic layer from further external factors or treatments later applied to the optical body, further improving its performance and the permanence of this performance over time. Being a non-restrictive example the third layer can be deposited by means of a water-based solution. In a further example, the third layer can be deposited by means of a solution equal to the one used for the deposition of the first layer.

The process according to the first embodiment comprises as a further step, this too being optional, the deposition onto said third layer of a fourth layer comprising a silicone or polyurethane lacquer. The substances of the third and fourth layers must therefore be selected so that the third layer is not solubilizable in the solution that comes to form the fourth layer, similarly to what has been discussed for the first three layers. Thanks to the fourth layer it is possible to provide the photochromatic optical element a further advantage consisting in endowing it with a particular resistance against external attacks of mechanical or chemical type. The interposition of the third layer between the second photochromatic layer and the aforementioned fourth layer allows di poter applicare un quarto strato conferring on the optical element determinate mechanical and chemical properties without said fourth layer coming to impair the properties of the photochromatic second layer. In other words, thanks to the third protective layer arranged on the second photochromatic layer, it is possible to apply a series of treatments to the optical element without these coming to damage the photochromatic properties of the resulting optical element. In other words, the third layer has the function not only of isolating the second photochromatic layer from the outside, but also of allowing the application of other layers or processes onto the outside of the optical element which would otherwise damage the photochromatic layer.

In the process described above, the second layer can comprise organic photochromatic pigments solubilizable in an organic solution and mixed with the solution of a resin. In the process described above, the step of depositing said first layer can be performed by immersing the optical body in a solution comprising the transparent resin. The immersion can then be followed by the thermodrying of the resulting product.

The successive steps of depositing other layers can equally be performed by immersion of the optical element including the layer(s) previously deposited in a suitable solution as explained above in a further example.

The steps of immersion described above can be performed according to the technique of dip-coating, in a non-limiting embodiment. The parameters for the dip-coating will naturally be selected according to the requirements and then carefully checked during the performance of the various steps of the process. Other systems of deposition can however be considered, such as for example spray-coating or spin-coating, or other systems of "wet-coating" consisting of depositing appropriate solutions which must then be exsiccated or dried. The advantage of the application of dip-coating compared with other techniques consists in the uniformity of application of each layer.

A detailed example of the process according to the present invention will now be described with reference to the technique of dip-coating. The invention can also be applied to other "wet-coating" techniques with suitable parameters. The dip-coating method consists of immersing a substrate (lens, optical element) in a liquid coating solution, then withdrawing it from the said solution at a constant speed, controlled and well-defined, in an environment free of dust (clean room), at a controlled temperature and in controlled environmental conditions. The principal steps of the process are as follows (see FIG. 1):

immersion of the substrate in the coating solution with formation of a wet layer on both the external faces of the substrate following its withdrawal from the solution (although, as said elsewhere, it is possible also to deposit on one face only);

gelation of the layers by evaporation of the solvent.

This latter step, depending on the volatility of the solvent, can be accelerated and completed in a heating chamber. If the withdrawal speed of the substrate from the solution is not high and the viscosity not excessive, in such a way that the fluid (coating solution) can be considered "newtonian", the thickness of the thin layer can be calculated by means of Landau-Levich's equation:

$$h = 0,94 \cdot \frac{(\eta \cdot u)^{\frac{2}{3}}}{\gamma^{\frac{1}{6}} \cdot (\rho \cdot g)^{\frac{1}{2}}} \quad (1)$$

where:
h=thickness of the thin layer
η=viscosity of the coating solution
u=constant linear speed of withdrawal of the substrate from the coating solution
Y=liquid-vapour surface tension
ρ=density of the coating solution
g=acceleration due to gravity As may be noted, the sensitive parameters for the formation of thin layers of appropriate thickness on ophthalmic lenses or optical elements, and with high optical qualities, are: speed of withdrawal of the substrates from the solution; viscosity of the solution; density of the solution; surface tension of the solution.

From equation [1] we infer that the thickness of a deposited layer:
increases as the viscosity of the coating liquid and the linear speed of withdrawal of the substrate increase; diminish as the surface tension and the density of the solution increase.

The detailed description of the deposition of the first three layers will be given below, noting that the third layer is completely optional and that other parameters can be used, although those indicated lead to properties and characteristics (for example, speed of colouration or of reversibility notably better than known photochromatic optical bodies.

First Thin Coating Layer (Base Layer or "Basis Layer")

The solution used for the deposition of the first layer (base layer) onto the substrates to be treated (lenses and optical elements) has the following characteristics: it is capable of forming a thin continuous film which ensures grip onto the substrate; it also functions as separator layer placed between the substrate and the subsequent active photochromatic layer, favouring its strong adhesion;

it is able to form thin films on already finished substrates consisting of various organic materials from polycarbonates to other types of thermally polymerizable resins (thermal curables) with different refractive indices.

The filmogenic resins used, contained in the first coating solution are of the "water-based" type (according to one example, the water content in the solution is between 68% and 75% by weight; the remaining part of the solvent mixture consists of organic solvents compatible and miscible with the water solvent which is predominant; it should be noted that there can be one or more organic solvents present).

The values of the functional parameters of the base coating solution have been optimized in an example of application of the present invention in such a way as to ensure the obtainment of a film having the thickness and the characteristics required.

These values are:
Density 1.0020-1.0030 g/cm3
Viscosity 8.0-13.0 cP
Surface tension 2.3*10−2-2.7*10−2 N/m The optimal values of the operative parameters found in the present example are:
Linear speed of withdrawal from the solution 1.5-1.8 mm/s
Temperature of the coating solution 15.0-20.0° C.
Temperature of the heating chamber 50-80° C. used for drying
Duration of the drying process 12-40 minutes at heat (depending on the temperature of the drying chamber)

However, the invention can equally be applied to other values, although results slightly different in terms of darkening and reversibility may correspondingly be obtained.

Second Coating Layer (Photochromatic Layer)

The solution used for the deposition by dip-coating of the second thin layer (photochromatic layer), onto the base layer already deposited and perfectly dried, has the following characteristics:

it is able to form a thin layer which is activated, darkening, if exposed to sunlight;

it is able to form a thin layer which adheres perfectly to the previously deposited base layer;

it contains, dissolved in the same mixture of solvents as contains the resin binder, a photochromatic compound or mixture of compounds. The resin which functions as binder is the filmogenic agent which forms a thin continuous layer. The solution containing the resin used as a binder is not "water-based" but "organic solvent-based" according to this example (the water content within it, according to one example of a composition of the second solution, is between 7% and a maximum of 12% by weight).

The solvent mixture used is able to solubilize both the resin binder and the photochromatic compounds compatible with it.

The photochromatic pigments disperse into the homogeneous solution of the resin binder without separating or precipitating. Among the components of the solution there is also, in an optional example, a stabilizing agent (stabilizer). This has the function of preserving the resin binder, first of all from degradation induced by the light; this stabilizer is also effective in relation to thermo-oxidation. According to this example, a stabilizer can be used belonging to the class of "sterically hindered amines" (Hindered Amine Light Stabilizers or HALS) i.e. derivatives of 2,2,6,6 tetramethyl piperidine, compounds endowed with high efficiency and proven longevity. The photochromatic pigments used are organic compounds belonging to the classes of the oxazines, naphthopyrans, spiropyrans, spirooxazines, indolinonaphthoxazines, or other compounds known to persons skilled in the art. The photochromatic pigments dissolved in the solution can be pure compounds or mixtures of various pigments; the object is to obtain a range of different colourations for the optical elements treated, when they are activated by light.

As in the case of the base coating solution, the values of the functional parameters of this second coating solution can be optimized by seeking the best compromise between them to ensure the best solubility of the components present in the quantities required, in a solvent mixture made up predominantly of organic solvents, with a small percentage of water.

The optimization of the functional parameters of the solution ensures that a layer is obtained of determinate thickness with the desired characteristics.

The optimum average values, however, are not easy to obtain, because simple experimentation is not sufficient. After careful consideration, it has been determined that functional parameters for the second coating solution, providing superior properties and characteristics to known optical bodies, are:

Density 0.9300-0.9600 g/cm3
Viscosity 4.0-9.0 cP
Surface tension $2.5*10-2-3.0*10-2$ N/m According to the considerations which led to this example, optimal values found for the operative parameters are:

Linear withdrawal speed from the solution 1.5-1.8 mm/s
Temperature of the coating solution 16.0-22.0° C.
Temperature of the heating chamber used for drying 50-80° C.
Duration of the drying process at heat (depending on the temperature of the drying chamber) 12-40 minutes.

While the solution used for the deposition of the first layer is, as has been said, water-based, the solution employed for the deposition of the intermediate photochromatic layer, on the other hand, is organic solvent-based with an average water content of around 10% according to the present example. This mixture of solvents, in fact, must have the property of dissolving equally well both the filmogenic resin used as a binder and the organic photochromatic compound or mixture of compounds. For this reason the mixture of solvents will consist in large part of strongly polarized and aprotic hydrophilic organic solvents together with organic solvents that are less polar but of protic type. The water present, not in high quantities (around 7-10% according to one example), has, as is known, ionizing and also dissociant characteristics because of the high value of its dielectric constant. Therefore, on the basis of the type of resin selected as a binder and the class of photochromatic pigment or mixture of pigments added, and their quantity, it is possible within certain limits to vary the composition of the mixture of solvents and the concentration of their components. Besides the aforementioned quantity of water it will be possible to select very polar hydrophilic organic solvents of aprotic type such as dimethylformamide (DMF), dimethyl sulphoxide (DMSO) and others of the same type together with variable quantities of polar hydrophilic solvents of protic type such as alcohols, glycols and glycolethers. The components of the photochromatic coating solution will thus be able to be various but the solutions which derive from them must anyway have values for the functional parameters (density, viscosity, surface tension) agreeing with or close to those already reported by us for the second coating solution according to this example; these parameters have in fact been optimized and tested for this method of dip-coating, providing more than satisfactory results for the product obtained. As has been mentioned, it is imaginable to apply these two water-based and organic solvent-based solutions also to other methods such as dip-coating or spray-coating.

Third Coating Layer (Protective Layer), Optional.

The solution used for the deposition of the third layer, onto the thin photochromatic layer already deposited and perfectly dried (second layer), has the following characteristics according to this optional example:

it is able to form a thin layer which performs a protective function on the photochromatic layer against actions of mechanical or chemical type exercised by external agents; it is able to form a thin layer which besides performing the aforementioned function on the photochromatic layer below it, ensures the adhesion of a further layer of lacquer having anti-scratch functions, to be deposited subsequently onto it. The solution has the same composition as the coating solution used for the deposition of the first base layer.

The optimized values of the functional parameters are therefore the same as those reported for the first layer (base layer) according to this example.

The optimal values of the operative parameters are the same as those reported for the first layer.

The example described above using dip-coating makes it possible to obtain photochromatic optical bodies having speeds of colouration or fading (reversibility) much higher than known lenses.

The process according to the present invention is applied to an optical body already formed and finished, produced for example by means of a mould. In producing the optical body, the starting material is subjected to a series of treatments. The process of the invention, however, is applied to the already finished body. Therefore, the application of one or more of said layers to said finished optical body avoids the mechanical, thermal and/or chemical stress which however there would have been in the event that the photochromatic pigments were mixed and cured with the material of the optical body or deposited in the mould and subsequently cured together with the material constituting the optical body or deposited directly onto the surface of the optical body.

The process according to the present invention anchors the photochromatic layer (resin+dissolved pigments) onto an already polymerized lens (finished lens); in addition, this photochromatic layer is not deposited directly onto the surface of the lens but onto another layer consisting of a resin which isolates it from the matrix of the basic lens, allowing it, at the same time, a strong and stable adhesion to it. There is no possibility of even partial transfer of the photochromatic pigments from the resin of the layer which contains them to the matrix of the lens, because the first layer, which provides anchorage to the lens, constitutes a barrier which in fact prevents such transfers. Besides, the thermo-drying systems for the layers deposited onto the matrix of the basic lens are not such, by reason of duration or temperature, as to produce transfers of material between contiguous layers (as in a long cycle of curing necessary for the formation of the basic lens. In one embodiment the first layer which enables the photochromatic layer to be anchored to the optical body is a separator layer with grip characteristics such as to enable anchorage of the subsequent layer. This first layer is selected so as not to be solubilizable with the photochromatic layer. Various types of resin can be used provided that they maintain a certain level of transmittance so as to not impair the optical properties of the underlying optical body. This allows a separation between the matrix of the optical body and the photochromatic pigments, and at the same time a stable anchorage of the photochromatic layer. One advantage therefore consists in an anchored structure, stable over time.

The present invention springs from these technical considerations, and from careful observation and identification (which was not immediate) of the mechanisms which lead to an improvement in the performance of photochromatic optical elements. In other words, the process of multi-layer deposition by means of the dip-coating technique makes it possible to obtain the deposition of a photochromatic layer protected from the surface of the optical body and optionally also from the outside, without said photochromatic layer undergoing substantial thermal, mechanical and/or chemical stress. The consequent photochromatic optical element possesses notable photochromatic properties distinguished by a striking speed of reaction to variation in the intensity of the light. Among its properties is also a high degree of reversibility.

Optical elements according to the invention are therefore able to darken and clear very quickly. Laboratory tests have demonstrated a remarkable improvement compared with lenses produced according to the techniques already known in the art.

A second embodiment of the present invention provides a photochromatic optical element obtained by one of the processes or steps of the processes described above.

A third embodiment of the present invention provides a photochromatic optical element comprising a given optical body, a first layer comprising a transparent resin arranged on the optical body and a second layer comprising photochromatic pigments. The second layer is arranged on the first layer and the first layer in one example is such as to isolate the second layer comprising photochromatic pigments from the material of the optical body.

According to an optional modification of the third embodiment, the photochromatic optical body comprises two opposed faces, whereby each of said first layer and said second layer are arranged, respectively, on each of said two opposed faces. An example of this configuration is represented in FIG. 2, in which is represented an optical body having a shape characterized by two opposed faces. On each of said faces is arranged a first layer; on each first layer of each face is then arranged a second layer. The first layer and the second layer are arranged on the two faces obtained according to the present invention.

Further embodiments of the present invention also provide products comprising the photochromatic optical element described above. This product can consist for example, of an ophtalmic lens, of a solar filter, of a sun lens whose transparency varies according to the intensity of the sunlight, of a visor, of a helmet, of an optical filter, of a transparent panel or of a photochromatic windscreen. In fact the optical element of the invention can be applied to any optical body having a determinate transparency to which it is desired to apply photochromatic properties.

The process, the optical element, the articles or products comprising an optical element according to the invention have the advantage that the photochromatic pigments are found in an environment more favourable for the exploitation of the conformational reversibility of the molecules themselves; with the result of obtaining shorter darkening times when the unactivated, i.e. transparent, optical body is subjected to intense sunlight; and of obtaining shorter fading times when the activated, i.e. dark, lens passes into a closed environment, not illuminated by sunlight. The process of the invention resulting in these advantageous optical bodies, is furthermore in itself very efficient, leads to high yields, is easy to reproduce and simple to put into practice.

Other embodiments of the present invention will be presented below, or some implementations relating to some steps or parts of the present invention.

According to one of these embodiments, the present invention provides a process for the treatment of organic ophthalmic lenses. It is obvious that the same process can be executed also on finished optical bodies other than ophthalmic lenses, for example on helmet visors, on flat, concave or convex transparent surfaces, etc. . . . It is also obvious that the process can be applied to other types of ophthalmic lenses.

The procedure according to one embodiment is based on a series of treatments of the surfaces of a finished ophthalmic lens, of various refractive index, performed in sequence with the technique of sol/gel dip-coating. The finished lens is a finished ophthalmic lens produced according to one of the methods known to a person skilled in the art.

The treatments effected in sequence on a lens are as follows. It is to be understood that not all the treatments have to be performed. In fact, even only one or a combination of two or more of the following treatments can be performed according to the present invention.

Treatment of the Finished Organic Ophthalmic Lens.

The finished organic ophthalmic lens, of various refractive index, is immersed in a tank containing the solution of a transparent resin, by means of a dip-coater. This operation has the task of preparing the ophthalmic lens for the subsequent treatments and of isolating it from the overlying layer containing the photochromatic pigments. The viscosity, the solid content of the covering resin solution, the immersion time and the speed of withdrawal of the products from the resin solution are rigorously controlled and are important for obtaining a first covering layer having determinate characteristics. The lens thus treated then undergoes thermo-drying.

Preparation of the Photochromatic Coating

Determinate quantities of a mixture of photochromatic organic pigments of suitable colour are solubilized in the solution of a resin. This solution must have determinate characteristics of solid content (% w/w of resin in the solution) and viscosity. These characteristics must be rigorously controlled, regulating the solid content and the viscosity by means of dilution of the base resin with suitable solvents.

Treatment of the Ophthalmic Lens

The lens to be treated is then immersed in another tank containing the photochromatic coating by means of a programmable dip-coater. The thickness of the active photochromatic layer which is deposited onto the preceding layer is of primary importance. This is ensured by critical parameters which regulate the process:

the rigorously controlled viscosity of the solution of the resin containing the photochromatic pigment;

the time of immersion in the tank;

the constant speed of withdrawal of the lens from the tank;

The solid content of the resin solution containing the pigments in solution and the consequent density.

There follows the thermo-drying of the second layer deposited.

Treatment of the Ophthalmic Lens.

The lens, already subjected to the two preceding treatments and suitably dried, is immersed, with the use of a dip-coater, in another tank containing the solution of a resin having controlled viscosity and solid content. The resin used for this third treatment has the characteristic of protecting the underlying photochromatic layer by isolating it from the outside. After a determinate time of immersion, the lens is withdrawn at a constant and controlled speed. There follows the thermo-drying of the layer deposited.

Treatment of the Ophthalmic Lens

The lens is finally immersed, still with the aid of the dip-coater, in a last tank containing a polyurethane resin which has the function of rendering it resistant to external attacks both of mechanical and of chemical type. For this last treatment too, control of the critical parameters is essential, such as the viscosity and the solid content of the solution which ensure the obtainment of a layer of suitable thickness. This last hardening layer thus deposited is finally suitable for receiving a final treatment of anti-reflection coating (AR).

Other embodiments provide for the application of only some of the treatments referred to above. For example, according to one embodiment, a lens is obtained by applying only the first treatment for depositing the first isolating layer and the second treatment for depositing the photochromatic layer.

According to other embodiments, the process or one or more of the treatments described above can also be performed using other techniques such as spray-coating or spin-coating. For example, depositing the first and the second layer can be performed by means of spray-coating or spin-coating or any combination of spin-coating, spray-coating and dip-coating. For example, the first layer can be deposited by dip-coating and the second by spray-coating. All combinations are in fact possible even for the further coatings.

Other embodiments provide some variants to the process described which can concern:

- the type of resins used in the various courses of treatment of the finished ophthalmic lenses;
- the automation systems for the steps of industrial production.

The present invention provides optimal solutions capable of overcoming or reducing the technical problems presented by other processes currently employed in the production of optical bodies such as photochromatic ophthalmic lenses present on the market. In summary, the present invention:

- eliminates completely the system based on the dispersion of organic photochromatic pigments inside the mass of the prepolymer before the final reticulation of the resin occurs inside the mould; as a result, there are none of the disadvantages already described, which are presented by photochromatic ophthalmic lenses produced in that way;
- adopts a more complex process based on treating only the outer surfaces of the lenses with photochromatic pigments;
- by depositing the active surface layer by means of dip-coating, achieves the further advantage of having a uniform and regular application of the thickness of the photochromatic layer;
- does not thermally transfer the organic pigments by diffusion into the outermost surface layer of the ophthalmic lens; indeed avoids any direct contact between the material which constitutes the ophthalmic lens and the active layer containing the photochromatic pigments;
- creates a more favourable environment, external to the lens and completely separate from it, in which the molecules of the photochromatic pigments can more freely assume their various steric conformations.

Other advantages can be summarized thus, with reference to ophthalmic lenses, even though the same advantages are found in any other photochromatic optical element according to the present invention.

- photochromatic ophthalmic lenses produced by this innovative process do not have all the disadvantages previously listed relating to ophthalmic lenses produced by the system of dispersing the organic pigments into the mass of the lens;
- photochromatic ophthalmic lenses thus produced do not have differences causing greater intensity of colouration depending on the thicknesses of the finished lenses subjected to treatments;
- with this process it is possible to treat finished ophthalmic lenses of different refractive indices;
- in the event that defective lenses are produced because of errors which typically can happen in a production process: unlike other processes known in the state of the art, it is possible to salvage all base products already treated, remove from them the treatments containing defects and subject them again to the process of photochromization;
- in this process the molecules of the pigments are confined in an outer layer completely separated from the surface of the base ophthalmic lens, with which material they have no contact; the layer with the photochromatic pigments, furthermore, is situated between two protective layers in one embodiment: an underlying layer which "isolates" it from the organic ophthalmic lens; the other, overlying it which "locks it in", protecting it from any damage from the outside (impacts, scratches, abrasions, attacks by solvents, detergents etc.)

The solution adopted is such as to create an environment more favourable for the pigment molecules, which can more freely assume the steric conformations necessary for exercising their photochromatic activity. This property is demonstrated concretely by a faster and more obvious reversible fading rate.

In the event that the deposition of the layer or layers is effected by dip-coating, the following should also be noted. Dip-coating comprises immersing the optical body in a determinate solution. It follows that the optical body normally comes to have a layer deposited all around it (regardless whether it be the first, second, third or fourth of one of those described above). For example, in the event that the optical body is an ophthalmic lens to which dip coating is applied according to one of the embodiments described above, it is possible to obtain an optical element in which the lens has respective layers on both the faces of the lens. The presence of two photochromatic layers on both the faces of the lens brings with it the further advantage of increasing the intensity of the darkening, and brings with it greater durability in time of the photochromatic properties. However, it is possible also to create optical elements such as ophthalmic lenses by means of dip coating having a single face exposed to the treatment(s) according to the invention. This is possible for example by carrying out the dip-coating over the entire lens or optical body and subsequently removing the layer(s) deposited on one of the two faces. The removal can be effected in any manner, as known to a person skilled in the art. Another solution consists in applying to one of the two faces on which deposition of the layer(s) is not desired, a further layer such as not to allow the deposition of the solution in which the optical body or lens is immersed. This further layer can be selected so as to remain unaffected by adhesion of the agents of the solution in which the body is immersed. In this case, if the layer does not affect the optical properties of the body, it can be left. Alternatively, the further layer can be such as to be able to be removed very easily. Advantages of the double stratification (i.e. deposition of layers on two faces of the lens) consist for example in the possibility of activating one layer, for example the inner one not exposed directly to the light source, by means of reflected light with a consequent increase in the photochromatic properties and reaction times of the optical element in its entirety. A further advantage consists in prolonging the average life of the photochromatic optical element.

According to a further embodiment, therefore, the process of the invention makes it possible to make active, from the photochromatic point of view, both surfaces, outer and inner, of organic ophthalmic lenses with a system of multiple stratification which positions the layer containing the photochromatic pigments completely outside the ophthalmic lens and separate from it, contained between two protective layers which guarantee it greater durability over time and greater speed of gradual clearing (fading rate). The new process is applied to an already finished organic ophthalmic lens, of various refractive index and various gradation, and is effected by subjecting the lens itself to a series of operations of treatment of the surfaces, executed in sequence. Each treatment performs a particular function and creates a thin surface layer, external to the materials of which these products are made.

The process of the invention transforms an already finished optical body such as an organic ophthalmic lens into a product which is activated if exposed to sunlight, reversibly diminishing its percentage transmittance. Optical bodies such as photochromatic lenses thus produced, furthermore, can be subjected subsequently to normal anti-reflection (AR) treatments on their outer surface.

According to another embodiment, the present invention consists of an optical element comprising a structure of sandwich type made up of three thin layers.

The central layer of the sandwich consists of a film of photochromatic organic pigments solubilized in a suitable organic solvent and mixed with the solution of a resin.

The photochromatic pigments or mixtures of pigments used belong to the normal classes of photochromatic molecules which may be found today on the market, which have the characteristic of being soluble and compatible with organic solvents such as Toluene, Xylene, THF, Ethyl acetate, Dimethyl ketone, Ethanol or other alcohols, Hydrocarbons (petroleum ethers), necessary for the preparation of a sol (resin+solution of photochromatic pigments in an organic solvent).

The viscosity and the solid content of the resin/photochromatic pigments/organic solvents sol must be rigorously controlled because they are important parameters for obtaining an optimal photochromatic layer having the required characteristics.

The layer of resin containing within it the photochromatic pigments has an optimal thickness and contains a high concentration of pigments sufficient for bringing the ophthalmic lens, at the end of its period of irradiation with UV lamp, to a maximum rate of darkening, corresponding to Transmittance percentage values (T %) between 13% and 18%. The lower layer of the sandwich containing at its centre the photochromatic layer has characteristics of strong adhesion to the surface of the finished ophthalmic lens.

The upper layer of the sandwich, besides having the function of protecting the photochromatic layer by isolating it from the external environment, has characteristics which are such as to allow subsequent hardening treatment, producing the further advantage of making the lens altogether similar, as regards physical characteristics, to an antiscratch lens. The tests, well-known to experts in the sector, to which lenses treated by this process have been subjected (tests for abrasion, flexion and resistance to thermal shock have shown behaviour altogether similar to that of normal antiscratch lenses.

The methods used for the deposition of the layers constituting the active sandwich were those known to experts in the field and normally used, such as spin-coating, spray-coating and dip-coating, with a preference for the latter method. The considerations made above are valid for the lens under discussion.

The layers deposited are typically subjected to thermodrying treatments at controlled temperatures.

This process can be applied to a variety of good-quality materials currently used for the production of ophthalmic lenses.

The invention can be applied indifferently to ophthalmic lenses with different refractive indices (from those with a low index to those with a high index).

The system of sandwich layers which isolates the active photochromatic layer from the material of the lens or of the support matrix creates a more suitable and favourable environment in which the photochromatic pigments can more freely assume the steric conformations necessary for exercising as well as possible their reversible photochromatic activity.

The location of the molecules of the pigments more functionally outside the lenses, and separate from the matrix of which they are constituted, translates into a fading speed markedly higher and with shorter times than both lenses made with colouration in the mass, and lenses obtained by thermal transfer of the pigments into the surface layers of the lenses.

One of the further advantages of the present invention consists in the fact that the molecules of the pigment are not transferred thermally to the aforementioned object. By contrast, according to the technique of the state of the art based on thermal transfer, the molecules would end up located inside the material of the lens, i.e. in an environment less favourable for the conformational reversibility of the molecules themselves to occur.

A further advantage is to be found in the application of the present invention to photochromatic optical elements formed from coloured optical bodies. Typically, such optical bodies have colouring pigments (or particles) mixed into the polymer of which the optical body is formed. The present invention applied to such coloured optical bodies is such as to not degrade and not interact with the colouring molecules of the optical body, and for this reason the efficiency of the optical body is improved in the case of different colourations of the optical body.

In other applications, it is possible to obtain photochromatic optical elements having a different colouration by means of the use of particular pigments in the photochromatic layer. This photochromatic layer provides a determinate colour to the lens. The present invention is therefore applicable to a great variety of colours and results in a great variety of colours being achievable for the photochromatic optical element. In the state of the art, on the other hand, applications are restricted to a few limited colours.

It should be noted that in the various embodiments described, each layer must be such as not to be solubilizable in the solution which is to constitute the next layer deposited on the previous one. In addition, the underlying layer must be suitable for anchoring the next one.

Reference has been made to photochromatic pigments capable of being activated reversibly in the presence of sunlight. Typically, photochromatic pigments are activated or deactivated in the presence or otherwise of wavelengths in the UV region. However, it is possible to apply the present invention also to other photochromatic pigments activatable by wavelengths other than those in the UV region.

Industrial Applications

The process described can be used industrially for the production of organic ophthalmic lenses or other optical elements, rendered photochromatic following the treatments described.

For production on a small or medium scale, automation of the entire treatment sequence of operations must be provided: this is necessary for maintaining quality control and perfect reproducibility of the operations. To this end and in general terms, the automation systems for the production process must preferably or if possible be based on the following suggested instructions (note however that other conditions for execution of the invention are completely valid):

the steps of the process must preferably be executed inside a clean room, at controlled temperatures and humidity;

as regards the production potential achievable with this system, it must be said that the process described is scalable, depending only (referring to the example of the use of dip-coating) on the dimensions of the tanks containing the various resin solutions, of the lens-carrying baskets or parts-holders, of the dip-coaters and of the thermal drying stations.

control systems will also be needed for the various resin solutions in order to keep frequent checks on their critical parameters such as viscosity and solid content;

Note also that the term 'transparency' (or 'transparent') has been used indifferently to signify transmittance, i.e. the capacity of a body to allow light to pass through it. This process thus presents another advantage, i.e. that of being scalable or applicable to the production of a few or many pieces of products of the same kind; it will only be necessary to make changes in the dimensions of some essential components in the production line.

FIG. 1 shows the steps relating to a dip-coating method. Step 1 refers to the immersion of the optical body (or several optical bodies as a group) in a solution (for example the first or second solution described above). In step 2, a thin layer starts to form on the faces of the optical body. The optical body is withdrawn from the solution. In step 3, gelation occurs as described above. FIG. 2 refers to a structure of a photochromatic optical body made according to the present invention, comprising an optical body 1 (optical element substrate) onto which is deposited a first layer (2, base layer (s)) representing the base layer. Over this there is a second layer (3, photochromatics layer) comprising the photochromatic pigments. Preferably, the second layer is made of heat-resistant material. Over this there is a third protective layer (4, protective layer) representing a protective layer. It must also be said that the present invention can also be applied to the deposition of thin photochromatic layers on polarizing or coloured films intended for being inserted (immersed) in the mass of an organic lens or glued between two glass optical bodies to convert them into polarizing and photochromatic or only photochromatic optical elements. The resulting structure will then be the optical body according to the invention and the claims, to which a method according to the invention will be applied for the purpose of obtaining a polarized photochromatic optical body with excellent darkening or fading properties. With a wet-coating method such as the dip-coating described above, it is also possible to deposit a thin photochromatic layer on a polarizing film or on a simply colouring and not polarizing film; such films in this way acquire the characteristic of darkening if exposed to sunlight and fading at the end of the irradiation, in an internal environment which is not illuminated. The photochromatic layer is deposited onto the polarizing film following deposition onto the latter of a thin base layer separating the photochromatic layer from the film, but favouring adhesion to it. With the deposition of the photochromatic layer the polarizing film acquires photochromatic properties without losing or undergoing reductions in its original polarizing capacity.

The polarizing photochromatic film thus obtained can be used by inserting it into a mould for ophthalmic lenses and then casting, in the same mould, a fluid monomer with the addition of a catalyst. The monomer is subjected to thermal curing which leads to its reticulation with the formation of organic ophthalmic lenses comprising the polarizing photochromatic film buried in the mass of the lens, positioned towards the outer surface, protected by a thin layer of resin against mechanical and chemical attack which may come from external agents against the film.

Although the method is not limited to dip-coating but extends to all "wet-coating" methods, at least in some circumstances the dip-coating method has numerous advantages. Among them we can cite the following:

dip-coating produces coatings consisting of uniform thin layers of high optical quality dip-coating entails simultaneous coating of both exposed surfaces of the substrate (ophthalmic lens, optical element etc.) with the creation of two active surfaces instead of one; the advantages which derive from this are twofold: first of all, that of greater efficacy in the darkening of the lens because it is the result of two active surfaces instead of one (even though the inner one is less irradiated), and then the advantage of greater and proven fading rate for the lenses as the solar irradiation decreases compared with photochromatic lenses produced with other systems. This second advantage can be explained by considering that with this method the total number of photochromatic molecules deposited onto a substrate (ophthalmic lens or other optical element) is distributed between two layers instead of only one; thus the smaller number of photochromatic molecules present per unit volume of resin in the photochromatic layer allows the molecules themselves to have more space with fewer steric obstructions to performing the processes of conformational reversibility, which translates into faster fading rates. However, as we have seen, the invention can also be applied to covering a single face.

unlike spin-coating, dip-coating does not have problems of the formation of gas bubbles which can remain trapped, compromising the uniformity of the layers;

dip-coating allows many pieces of substrate to be treated at the same time, unlike spin-coating which although having rapid execution times can be performed on only one substrate at a time.

with the dip-coating method, by selecting coating liquids of suitable viscosity it is possible to precisely vary the thickness of the deposited layers from 20 nm to 50 μm while maintaining high optical qualities;

with dip-coating it is possible to obtain greater thicknesses compared with other techniques of "wet-coating";

this method offers in any event the possibility of repeating the operation of depositing a second layer onto the first when it is already cured, thus increasing the thickness; since, however, this method makes it possible to obtain greater thicknesses compared with other methods, a single treatment is sufficient in many cases instead of several repeated treatments;

while the spin-coating method uses almost exclusively monomers polymerizable by the radical route (therefore UV curables) to carry the photochromatic molecules, the dip-coating method is excellent for the adhesion of thin thermopolymerizable layers;

The dip-coating method, however, allows equally a wide variety of methods of curing the thin layers deposited;

Furthermore, the present invention resolves numerous problems connected with dip-coating as practised in the state of the art. The principal problems presented by the method of dip-coating when used to obtain thin transparent layers, of appropriate thickness, with photochromatic properties and high optical qualities are as follows:

identifying a resin or mixture of resins to put into solution, suitable for forming a thin layer (base layer) capable of isolating an already-formed substrate (ophthalmic lens, optical element etc.) from other layers which are to be deposited later, at the same time favouring anchorage to the substrate itself.

identifying a suitable resin to function as a filmogenic binder, to be put into solution, compatible with a photochromatic organic compound or mixture of compounds solubilizable in the monomer solution itself;

difficulty of solubilizing in the resin solution the greatest possible quantity of the photochromatic compound or of the mixture of photochromatic compounds needed for conferring on the thin layer to be deposited the required photochromatic characteristics. The purpose of the above is to obtain a liquid coating solution which has a concentration of photochromatic compounds sufficient to avoid the process of deposition having to be repeated several times to obtain a final thickness of the thin layer with greater photochromatic potential.

difficulty therefore in ensuring that the thin photochromatic layer obtained by means of a single dip-coating operation is able, after irradiation with sunlight and at maximum darkening, to reach values for transmittance percentage (T %) comprised between 13% and 18%.

difficulty therefore in researching the best mixture of solvents capable of ensuring the solubility of the components of the coating liquid and the greatest concentration of binding resin and photochromatic compounds;

in researching the best composition for the coating liquid based on the preceding considerations, it is however necessary to obtain, at the same time, appropriate values for viscosity and density; greater viscosity and less density for the coating liquid in fact lead to the deposition of layers with greater thicknesses for a given set of other sensitive parameters;

difficulty of researching for the coating solution, through the correct levels for its components (mixture of different solvents and solutes) the best compromise between the values of the sensitive parameters (viscosity, density, surface tension etc.);

difficulty, finally, in identifying the most suitable linear withdrawal speed of the substrate from the solution, in order to obtain, with determinate values for the sensitive parameters, an appropriate thickness for the photochromatic layer.

Thanks to the present invention the above problems are resolved or at the very least reduced, thanks to the particular selection of the first and second solutions, different from each other and, according to a further example, thanks to the first solution being water-based and the second solution having a base of organic solvent (or organic solvents).

The invention claimed is:

1. Process for the preparation of photochromatic optical elements starting from a given optical body, said process comprising the following steps:
    depositing a first layer at least onto a part of said optical body by depositing a first solution comprising a solution with a water base and a transparent resin; and
    depositing on the first layer previously deposited a second layer by depositing a second solution comprising a solution with a base of organic solvents and photochromatic pigments;
    wherein the first layer is not solubilizable with the second layer.

2. The process according to claim 1, comprising as a further step the deposition onto said second layer of a third layer comprising a solution of a resin, said third layer being such as to isolate the second layer from an outside.

3. A process according to claim 2, wherein depositing said third layer comprising a solution of a resin comprises depositing a solution having a water base comprising said resin.

4. The process according to claim 2, comprising as a further step the deposition onto said third layer of a fourth layer comprising a polyurethane resin.

5. The process according to claim 1, wherein the second layer comprises photochromatic organic pigments solubilizable in an organic solvent and mixed with the solution of a resin.

6. The process according to claim 1, wherein the step of depositing said first layer comprises immersing said optical body in a solution comprising said transparent resin and a subsequent thermo-drying.

7. The process according to claim 1, wherein depositing is executed by means of one of the techniques comprising dip-coating, spraying and spin-coating.

8. The process according to claim 1, wherein the first layer is such as to isolate the second layer comprising photochromatic pigments from the material of the optical body.

9. A photochromatic optical element obtained by means of the process according to claim 1.

10. A photochromatic optical element comprising:
    a given optical body;
    a first layer comprising a first solution comprising a solution with a water base and a transparent resin, said layer arranged on said optical body; and
    a second layer comprising a second solution comprising a solution with a base of organic solvents and photochromatic pigments and arranged on the first layer,
    wherein the first layer is not solubilizable with the second layer.

11. A photochromatic optical body according to claim 10, wherein said photochromatic optical body comprises two opposed faces and wherein each of said first layer and second layer is arranged, respectively, on each of said two opposed faces.

12. A product comprising a photochromatic optical element according to claim 10.

* * * * *